United States Patent [19]
Brinkmann et al.

[11] Patent Number: 4,798,878
[45] Date of Patent: Jan. 17, 1989

[54] SYNTHETIC RESIN COMPOSITIONS SHELF-STABLE UNDER EXCLUSION OF MOISTURE

[75] Inventors: Bernd Brinkmann, Nordkirchen; Hermann-Josef Lucas, Ascheberg-Herbern, both of Fed. Rep. of Germany

[73] Assignee: Schering Aktiengesellschaft, Berlin and Bergkamen, Fed. Rep. of Germany

[21] Appl. No.: 756,626

[22] Filed: Jul. 19, 1985

[30] Foreign Application Priority Data

Jul. 21, 1984 [DE] Fed. Rep. of Germany ....... 3426987

[51] Int. Cl.[4] .............................................. C08L 91/00
[52] U.S. Cl. ....................................... 528/28; 528/33; 528/38; 528/49; 528/59; 528/901
[58] Field of Search ............... 528/28, 59, 49, 33, 528/38, 901

[56] References Cited

U.S. PATENT DOCUMENTS 4,590,224  5/1986  Frisch, Jr. ............................. 528/28

OTHER PUBLICATIONS

Chemical Abstracts, vol. 90, 1979, p. 71, No. 188320q.

*Primary Examiner*—Maurice J. Welsh
*Assistant Examiner*—M. L. Moore
*Attorney, Agent, or Firm*—Millen & White

[57] ABSTRACT

Coating, sealing and adhesive compositions which are shelf-stable under the exclusion of moisture are produced from polyether urethanes containing prepolymeric NCO groups and alkoxysilanes having amino or mercapto groups and $\geq 2$ ether oxygen atoms in at least one alkoxy residue.

21 Claims, No Drawings

SYNTHETIC RESIN COMPOSITIONS SHELF-STABLE UNDER EXCLUSION OF MOISTURE

BACKGROUND OF THE INVENTION

In recent years, elastic synthetic resin compositions, for example, adhesives and sealants for absorbent and nonabsorbent subsurfaces and surfaces, have gained increasingly in importance, particularly in the building industry. While "Thiokol" sealants have been utilized in earlier years to a predominant extent, silicone and polyurethane sealing compounds have found increasing use more recently.

Elastic coating, sealing, and adhesive compounds are utilized as joint sealants for the sealing of prefabricated building components and exposed concrete surfaces. They must compensate for considerable temperature-dependent movements in addition to performing the actual sealing function. During this process, stress-strain forces occur which can place a considerable load on the adhesion surface. They are also employed as adhesives and sealants in the automobile industry where they are utilized with special advantage for sealing glass to metal, for example, for the mounting of windshields, and for other purposes where metal must be glued to metal.

Stringent requirements are placed on the adhesive power as well as the curing rate of the resins in these applications.

DOS No. 2,738,979 discloses a process for the production of crosslinkable polyurethane prepolymers with end positioned alkoxysilyl groups. The prepolymers harden under the effect of moisture at room temperature into elastic products having good mechanical properties and good adhesion. However, these products have the drawback that their curing rate, particularly in the layers of $\geq 1$ mm primarily encountered under practical conditions, does not satisfy requirements. Due to the slow skinning, the surfaces remain tacky for a long time. Dust and dirt particles can settle thereon whereby their mechanical properties as well as external appearance are impaired. Moreover, the coating seal, or adhesive bond does not attain the frequency required load-bearing capacity within practical time limits.

SUMMARY OF THE INVENTION

Therefore, it is an object of the present invention to overcome or coordinate these disadvantages of the prior art and to provide synthetic resin compositions which can cure in the presence of atmospheric humidity and which have, in addition to good adhesion and good mechanical properties, an accelerated curing rate.

Upon further study of the specification and appended claims, further objects and advantages of this invention will become apparent to those skilled in the art.

These objects have been attained by using, as the synthetic resin compositions, reaction products of prepolymeric isocyanates and amino- and mercaptosilanes.

The present invention, thus concerns a process for the production of synthetic resin compositions and the resultant compositions themselves, that are shelf-stable under exclusion of moisture, wherein polyether urethanes containing prepolymeric NCO groups, which include at least two isocyanate groups per molecule, are reacted with at least one alkoxysilane compound of the general formula

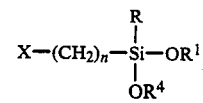

wherein
X = —SH, or —NHR$^2$
R = —CH$_3$, —CH$_2$—CH$_3$, or —OR$^1$
R$^1$ = +CH$_2$—CH$_2$—O)—$_m$R$^3$
R2 = H or —C$_2$H$_4$—NH$_2$ or an optionally substituted aliphatic and/or cycloaliphatic or aromatic hydrocarbon residue of 1-10 carbon atoms, especially —CH$_3$, or —C$_2$H$_5$
R$^3$ = an optionally substituted alkyl residue of 1-10 carbon atoms, particularly 1-2 carbon atoms, or an aryl, e.g., phenyl residue
R$^4$ = one of the R$^1$ groups or an alkyl residue of 1-4 carbon atoms
n = 1-6
m = 1-30, preferably 1-15, especially 1-3, and are optionally combined with conventional, inert additives, auxiliary agents and/or accelerators.

DETAILED DISCUSSION

In the foregoing, for R$^2$, the aliphatic (1-10 C-atoms), cycloaliphatic (3-10 C-atoms) and aromatic (6-10 C atoms) moieties are typically hydrocarbon in nature. The aliphatic and cycloaliphatic moieties are saturated and can be straight chained or branched. They can all be substituted by one another.

The R$^3$ groups can also be straight chain or branched and suitable substituents for the alkyl and phenyl moieties include especially one or more —CH$_3$ or —C$_2$H$_5$ groups.

Alkyl throughout includes groups of the stated C-atom range which are methyl, ethyl, a propyl group, a butyl group, a pentyl group, a hexyl group, a heptyl group, an octyl group, a nonyl group, or a decyl group.

The silane compounds used in this invention can be obtained from known corresponding alkoxysilanes by interesterification reactions, for example, as disclosed in DOS No. 1,545,080, to yield the desired combination of alkoxy structures. See also Examples under A.

The proportion between the silanes and the prepolymeric isocyanates (polyether urethanes) can be varied, in terms of the number of reactive X and NCO groups, in the range from about 1:2 to 1:1. The choice of the quantitative ratio in a particular case depends on the molecular weight of the prepolymeric isocyanate and/or on the number of functional groups in the silane, on the desired degree of crosslinking of the final product, as well as on its desired mechanical properties. These selections can be made according to conventional considerations.

When using prepolymeric silane products still exhibiting free NCO groups, the free NCO groups can be reacted with monofunctional amines, mercaptans, alcohols, etc. Liquid alcohols of 4-18, especially 10-18 carbon atoms are preferably utilized. Preferred are butylamine, decylamine, dodecylamine, stearylamine, butanol, hexanol, decanol, dodecanol, stearyl alcohol, nonyl phenol, or their mixtures with one another or among one another.

If desired, the chain length of the prepolymeric silanes can be increased by reacting the free NCO groups with difunctional or polyfunctional alcohols, mercaptans and amines, etc. Preferred chain-lengthening agents are butanediol, hexanediol, diethylene glycol, trimethylhexanediols, hexamethylenediamine, trimethylhexamethylenediamine, or their mixtures with one another or among one another.

By choosing suitable silane/NCO ratios, molecular weights of the prepolymeric isocyanates, chain terminators and/or chain extending agents, the degree of cross-linking and mechanical properties of the cured final product can be regulated as desired. The selections are all made using conventional considerations, see, e.g., U.S. Pat. No. 3,632,557, column 2 to column 7. which disclosure is incorporated by reference herein.

The polymeric silanes can still contain free NCO groups. However, according to this invention, products are preferred wherein no free isocyanate is detectable by IR spectroscopy. Typically, these prepolymeric silane products have typical molecular weights of about 1,000–35,000, preferably about 2,500–30.000 (weight average, calculatet from % NCO-content of the prepolymeric isocyanate and molweight of the silan) and are crosslinkable in the presence of moisture to a typical degree of 3 to 9.

The prepolymeric polyether urethanes typically involve reaction products of polyols with an excess of isocyanate and have molecular weights in the range of about 1,000–30,000, preferably about 2,000–25,000. (weight average calculatet from % NCO-content of the prepolymer).

Usually employed as polyols are polyether polyols obtained by an anionic polymerization, copolymerization and/or block copolymerization of alkylene oxides, such as ethylene oxide, propylene oxide and butylene oxide, with by- or polyfunctional alcohols, such as 1,4-butanediol, 1,1,1-trimethylolethane, 1,1,1-trimethylolpropane, 1,2,-6-hexanetriol, glycerol, pentaerythritol and sorbitol, or with amines, such as methylamine, ethylenediamine and 1,6-hexamethylenediamine, as the starting components, or by cationic polymerization and copolymerization of cyclic ethers, such as tetrahydrofuran, ethylene oxide and propylene oxide, with acidic catalysts, such as boron trifluoride etherate, or by polycondensation of glycols that can be polycondensed with water being split off, such as 1,6-hexanediol, in the presence of acidic etherification catalysts, such as p-toluenesulfonic acid; and also, for example with a view toward obtaining flame-retardant effects, alkoxylation products of phosphoric acid and phosphorus acids, e.g., with ethylene oxide, propylene oxide, butylene oxide and styrene oxide. Preferred polythioether polyols are the polycondensation products or thiodiglycol with itself and with diols and/or polyols, such as, for example, 1,6-hexanediol, triethylene glycol, 2,2-dimethyl-1,3 propanediol, and 1,1,1-trimethylolpropane, in the presence of acidic etherification catalysts, such as phosphoric acid and phosphorus acid. Preferred polyacetals are the polycondensation products of formaldehyde and diols and/or polyols, such as diethylene glycol, triethylene glycol, 1,4-butanediol, 1,6-hexanediol, thioglycol and 1,1,1-trimethylolpropane, with acidic catalysts, such as phosphoric acid and p-toluenesulfonic acid. Suitable polyester polyols are preferably the condensation products with di- and/or polycarboxylic acids and di- and/or polyols prepared by polycondensation, for example, of adipic acid, phthalic acid, tetrahydrophthalic acid, hexahydrophthalic acid and ethylene glycol, 1,4-butanediol, diethylene glycol, triethylene glycol, 1,6-hexanediol, 2,2-dimethyl-1,2,6-propanediol, furthermore polycarbonates of the aforementioned di- and polyols, and polyester amides with the additional use of amino alcohols, such as, for example α-caprolactone. Suitable polyether components and methods for their preparation are well known, e.g., see U.S. Pat. No. 3,632,557 column 2 line 60 to column 4 line 20. which disclosure is incorporated by reference herein.

The polyether polyols generally have molecular weights from about 300 to 20,000. According to this invention, polypropylene glycols are preferred having molecular weights of about 500–6,000.

The above-mentioned polymerization and polycondensation products are conventionally converted with di- and/or polyisocyanates into so-called isocyanate prepolymers which contain isocyanate groups. If a chain-lengthening reaction by way of urethane groups (OH+N=C=O) can be tolerated or is even desirable, then the hydroxy-group-containing polymerization or polycondensation products are reacted in an NCO OH ratio of about 1.1–2.5:1 with the di- or poly-isocyanates. By "poly" here is meant generally up to 5 preferably 3 isocyanate groups in a compound or polyisocyanates of up to about 50 monomer units (prepolymers). If a chain-extending reaction is undesirable, then a substantially larger excess of di- or polyisocyanate is utilized, calculated preferably for an NCO/OH ratio of about 3–5; otherwise, the reaction is carried out in the same way as in the case of the lower NCO/OH ratios, see, e.g., U.S. Pat. No. 3,941,753 column 3 lines 20–42. which disclosure is incorporated by reference herein. The excess di- or polyisocyanate is removed, for example in case of distillable di- or polyisocyanates by thin-film distillation or, in case of isocyanates that cannot be distilled, by means of solvent extraction.

Examples of suitable di- or polyisocyanates are: toluene-2,4-diisocyanate as well as its technical mixtures with toluene-2,6-diisocyanate, toluene-2,6-diisocyanate, diphenylmethane-4,4'-diisocyanate, 1,6-hexamethylene diisocyanate, dimer fatty acid diisocyanate, 1,5-naphthalene diisocyanate, m-xylylene diisocyanate-1-methyl-2,4-diisocyanatocyclohexane, isophorone diisocyanate, 2,4,4-trimethyl-1,6-diisocyanatohexane, dimeric toluene-2,4-diisocyanate, N,N'-di-(4-methyl-3-isocyanatophenyl)urea, N,N',N"-tri-(6-isocyanatohexyl)biuret, triphenylmethane 4,4',4"-triisocyanate, and reaction product from 3 moles of toluene-2,4-diisocyanate and 1 mole of 1,1,1-trimethylol-propane, tri- and polymerization products of toluene-2,4-diisocyanate, mixed trimerization and mixed polymerization products of toluene-2,4-diisocyanate and 1,6-hexamethylene diisocyanate, mixtures of isomeric diphenylmethane diisocyanate, polyisocyanates containing more than two benzene nuclei linked via methane groups and diisocyanates with diphenylmethane structure, the isocyanate groups of which are partially converted into carbodiimide groups.

The polymerization and polycondensation products, having isocyanate groups can be prepared in bulk or in solvents inert with respect to isocyanates. After the reaction is completed, any solvents employed can be removed by distillation, preferably by thin-film distillation. However, it may be advantageous in some cases to further use the solutions of the isocyanate prepolymers directly for preparation of the silane products of this invention.

Suitable catalysts, typically utilized in amounts of 0.001–2%, are, for example, diazabicyclooctane, dibutyl-tin dilaurate, and tin(II) octoate.

Examples of suitable solvents are esters, such as ethyl acetate, butyl acetate, methyl ethyl ketone, methyl isobutyl ketone, aromatics such as toluene, xylene, and mixtures of higher aromatics, as well as mixtures of the aforementioned solvents.

The polymerization or polycondensation products, containing isocyanate groups, as they are prepared according to conventional methods from components such as those mentioned above can subsequently be reacted, in a known reaction, with the reactive groups of the silanes. See, e.g., U.S. Pat. No. 3,632,557 Example 1 column 5 line 34 to 56, which disclosure is incorporated by reference herein DE-OS No. 27 38 979 Page 6 last paragraph. The reaction can be conducted with or without a solvent, for example, benzene, toluene, xylene, cyclohexane, with or without a catalyst, dibutyltin dilaurate (DBTL), dibutyltindiacetat (DBTA), alkyltitanates, metal or amine salts of carboxylic acids, at typical temperatures of 20°–150° C. for typical times of 0,25–3 hours.

For producing the coating, sealing, and adhesive compositions in fully conventional fashion, it is furthermore possible to employ conventional inert fillers, pigments, coloring agent, plasticizers, thickeners, antioxidants, adhesion promoters, thixotropic agents, solvents and extenders, e.g., tars, tar pitches, asphalts not reactive with isocyanate, or synthetic resins, such as polyolefins, vinyl plastics, polyamides, as is customary in this field. Preferred fillers are sands, rock flour, calcium carbonate and, in particular, silicic acids, and preferred solvents are optionally substituted hydrocarbons or ketones. Typical total amounts of these additives are 5–30% by weight. See, e.g., U.S. Pat. No. 3,632,557, column 6 and Table II, IV which disclosure is incorporated by reference herein.

To accelerate curing, organic or inorganic compounds, such as, for example, dibutyltin diacetate, tetrabutyl dioleatodistannoxane in small amounts (e.g., 25–500 ppm.) can be added as catalysts.

The synthetic resin compositions of this invention are preferably utilized as elastic coating, adhesive, and sealing compositions for absorbent and nonabsorbent subsurfaces or surfaces, in particular in the construction and automobile sectors as mentioned above.

Throughout, the reactive group contents (OH,- NCO,X etc.) are determined fully conventionally, e.g. as disclosed in DIN No. 53 240, DIN No. 16 945. ASTM D1638-74 Vieweg/Höchtlen Bd. VII, Polyurethanharze 1966, S. 89, Carl Hanser Verlag, München; Methoden der Organischen Chemie (Houben Weyl), Bd. III, Teil 1, S. 327–448, Georg Thieme Verlag, Stuttgart.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

A. PREPARATION OF THE SILANE COMPOUNDS WHICH ARE A COMPONENT OF THE COMPOSITION OF THIS INVENTION

Example A1

Interesterification of γ-aminopropyltrimethoxysilane with diethylene glycol monomethyl ether A flat-bottom apparatus equipped with internal thermometer, reflux condenser with calcium chloride tube and agitator was charged with 412 g (2.3 mol) of γ-aminopropyltrimethoxysilane, and 1,242 g (10.35 mol=50% excess) of diethylene glycol monomethyl ether was admixed thereto. The reaction mixture was heated under reflux for two hours, the boiling temperature being about 110° C.

After cooling off the reaction mixture, the reflux condenser was replaced by a distillation bridge. First of all, distillation yielded, under normal pressure, methyl alcohol released during the reaction and then, after recooling, under a vacuum of about 10 mbar, unreacted diethylene glycol monomethyl ether up to an internal temperature of 130° C.

979 g of a crude product was obtained which still contained about 13% by weight of diethylene glycol monomethyl ether. The interesterification product was constituted to an extent of about 75% of tris[2-(2-methoxyethoxy)ethoxy]silyl-3-aminopropane of the formula $H_2N-CH_2-CH_2-CH_2-Si-[O(-CH_2-CH_2-O)_2-CH_3]_3$, as confirmed by gas chromatography and mass spectrometry. In addition, the corresponding mono- and di-[2-(2-methoxyethoxy)]silyl compounds were obtained to a predominant extent.

The following silane compounds were prepared according to Example A 1:

| Example A | Formula |
|---|---|
| 2 | $CH_3-NH-(CH_2)_3-Si[-O-(CH_2-CH_2-O)_2-CH_3]_3$ |
| 3 | $HS-(CH_2)_3-Si[-O-(CH_2-CH_2-O)_2-CH_3]_3$ |
| 4 | $H_2N-(CH_2)_3-Si[-O-(CH_2-CH_2-O)_2-C_2H_5]_3$ |
| 5 | $H_2N-(CH_2)_3-Si(CH_3)[-O-(CH_2-CH_2-O)_2-CH_3]_2$ |
| 6 | $HS-(CH_2)_3-Si[-O-CH_2-CH_2-O-C_2H_5]_3$ |
| 7 | $H_2N-(CH_2)_3-Si[-O-(CH_2-CH_2-O)_2-C_2H_5]_3$ |
| 8* | $H_2N-(CH_2)_3-Si[-O-(CH_2-CH_2-O)_{9-30}CH_3]_3$ |
| 9* | $H_2N-(CH_2)_3-Si[-O-(CH_2-CH_2-O)_{10-15}-C_2H_5]_3$ |
| 10 | $H_2N-CH_2-CH_2-Si[-O-(CH_2-CH_2-O)_2-CH_3]_3$ |
| 11 | $H_2N-(CH_2)_3Si(C_2H_5)[-O(CH_2-CH_2-O)_2-CH_3]_2$ |
| 12 | $H_2N-CH_2-CH_2-Si(CH_3)[-O(-CH_2-CH_2-O)_2-CH_3]_2$ |
| 13 | $H_2N-(CH_2)_3-Si(O-C_2H_5)[-O(CH_2CH_2O)_2-CH_3]_2$ |
| 14 | $H_2N-(CH_2)_6-Si[O-(CH_2-CH_2-O)_2-CH_3]_3$ |
| 15 | $C_2H_5HN-(CH_2)_3-Si[-O(CH_2-CH_2-O)_2-CH_3]_3$ |
| 16 | $H_2N-(CH_2)_3-Si-[O(CH_2-CH_2-O)_2-\text{(phenyl)}]_3$ |
| 17 | $H_2N(-CH_2)_2NH(-CH_2)_3Si[-O(-CH_2-CH_2-O)_2-CH_3]_3$ |

*From technical mixtures of a methyl polyglycol and an ethyl polyglycol, respectively.

B. PREPARATION OF THE PREPOLYMERIC ISOCYANATES

Example B1

1,000 g of a linear polypropylene glycol, OH number 56.1, is combined with
222.3 g of isophorone diisocyanate. After adding 1.2 g of dibutyltin dilaurate (DBTL),
the mixture is heated under vigorous agitation to 75° C. and maintained at this temperature for 2.5 hours. The reaction product has an isocyanate content of 3.4%. (molecular weight (mw) ca. 2470).

The following prepolymeric isocyanates were prepared according to Example B 1:

| Example B | Polyol | Isocyanate | Ratio OH/NCO | NCO Content[1] % |
|---|---|---|---|---|
| 2 | Polypropylene glycol OH Number 56.1 | Isophorone diisocyanate (IPDI) | 1/1.8 | 2.82 |
| 3* | Polypropylene glycol OH Number 56.1 | IPDI | 1/1.305 | 1.12 |
| 4* | Polypropylene glycol OH Number 56.1 | Tolylene diisocyanate (TDI) | 1/1.195 | 0.75 |
| 5* | Polypropylene glycol OH Number 56.1 | IPDI | 1/1.099 | 0.375 |
| 6* | Polypropylene glycol OH Number 112 | Trimethylhexa-methylene diisocyanate (TMDI) | 1/1.159 1/1.159 | 1.08 1.08 |
| 7 | Branched polypropylene glycol OH Number 35.6 | IPDI | 1/2 | 2.25 |
| 8* | Polytetrahydrofuran OH Number 55.5 | IPDI | 1/2 | 3.07 |
| 9 | Linear polyglycol with propylene oxide and ethylene oxide, OH Number 55 | IPDI | 1/2 | 3.38 |

[1]Calculated based on solid matter
*70% Solution in xylene

C. PREPARATION OF THE PREPOLYMERIC SILANES

Example C1

I.

153.5 g of silane A 1 is added dropwise to 1,000 g of the prepolymeric isocyanate produced in B, the temperature being maintained between 55° and 80° C. The NCO content of the reaction product amounts to 1.7%.

II.

43.6 g of a polyoxypropylenediamine having a molecular weight of 400 and an amine number of 280.5 ("Jeffamin" D 400, trademark of Jefferson Chemical, Houston, USA) is added dropwise at a reaction temperature of 55°–80° C. as chain extender to 1,000 g of the above reaction product.

The NCO content of the product, after this step, amounts to 0.75%.

III.

34.7 g of dodecanol, OH number 288, and 0.1% DBTL are added to 1,000 g of the reaction product in II and the mixture is heated to 75°–80° C. The reaction is continued until no free NCO can be detected any longer in the IR spectrum. MG* about 25,000.

(*)MG=molecular weight

According to Example C 1, the following prepolymeric silanes were produced; stages II and III can also be omitted individually or jointly, and an exchange of components can include one of the disclosed changes in reaction conditions.

When using mercaptosilane in I, the reaction mixture of mercapto compound and isocyanate must be heated to 75°–80° C. with concomitant use of 0.1% DBTL, based on the reaction mixture.

When using, as the chain extenders in II, mercapto compounds or alcohols in place of the amines, the reaction mixture must be heated to 75°–80° C. with concomitant use of a catalyst. Analogous remarks apply in connection with III.

| Example C | Silane A | Isocyanate B | Ratio A/B[1] Based on Reactive Groups | NCO Content % | Chain Extender % | NCO Content % | Chain Terminator % | NCO Content % | molecular weight about |
|---|---|---|---|---|---|---|---|---|---|
| 2 | 1 | 2 | 1:2 | 1.22 | Butanediol | 0.61 | — | 0.61 | 6,600 |
| 3 | 1 | 2 | 1:1 | 0 | — | — | — | — | 3,600 |
| 4 | 2 | 3 | 1:1.5 | 0.35 | — | 0.35 | Nonylphenol | 0 | 12,100 |
| 5 | 3 | 4 | 1:1.8 | 0.32 | — | 0.32 | Stearylamine | 0 | 13,400 |
| 6 | 5 | 5 | 1:1.6 | 0.14 | — | 0.14 | Hexanol | 0 | 30,100 |
| 7 | 8 | 1 | 1:1 | 0 | — | — | — | — | 8,500 |
| 8 | 9 | 9 | 1:1 | 0 | — | — | — | — | 5,500 |
| 9 | 10 | 6 | 1:1.9 | 0.48 | Hexamethylenediamine | 0.23 | Dodecanol Stearylamine 1:1 | 0 | 13,400 |
| 10 | 13 | 7 | 1:1 | 0 | — | — | — | — | 4,400 |
| 11 | 14 | 8 | 1:2 | 1.30 | Butanediol Trimethylolpropane 0.75:0.25 | 0 | — | — | 35,000 |
| 12 | 16 | 9 | 1:1.5 | 0.84 | Diethylene glycol | 0.60 | Decanol | 0 | 7,500 |
| 13 | 17 | 9 | 1:2 | 1.62 | — | 1.62 | Dodecyl alcohol | 0 | 2,700 |

[1]Basis for calculation is the analytically determined characteristic number for group X

D. PREPARATION OF A SEALANT OR ADHESIVE COMPOUND

Example D1

350 g of the prepolymeric silane prepared according to Example C 5 was mixed in a planetary kneader with 39 g of a silicic acid, rendered hydrophobic ("Aerosil" R 974, trademark of Degussa, Frankfurt) for 15 minutes under vacuum (20 mbar).

0.4 g of dibutyltin diacetate was then added, and mixing was continued for 10 minutes under a vacuum of 20 mbar.

To test skinning time and rate of curing throughout, a round metal mold having a diameter of 55 mm and a depth of 9 mm was injected with the composition and cured under normal climate conditions.

The skinning time is the instant at which the surface is, for the first time, covered by a continuous skin.

The rate of curing throughout is determined by the thickness of the thus-formed skin.

A skinning time of 1½ hours and a curing rate throughout of 4 mm/day were found.

According to Example D 1, the following sealing compounds were produced and, under normal climate conditions (23° C., 50% relative humidity), tested for curing characteristics.

| Example D | Prepolymeric Silane According to Example C | Skinning Time | curing in mm/day |
|---|---|---|---|
| 2 | 1 | 1–2 h | 4 |
| 3 | 3 | 1.5 h | 4.5 |
| 4 | 5 | 1.5 h | 4.5 |
| 5 | 8 | 2 h | 4 |
| 6 | 11 | 1.5 h | 4.5 |
| 7 | 13 | 1 h | 4.5 |
| Comparative Example 1 | * | 24 h | Not Measurable Within Two Days |

*Prepolymeric silane from the isocyanate of Example B 2 and γ-aminopropyltrimethoxysilane in a ratio of reactive groups of 1:1

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A polymer which is the product of polymerizing a polyether urethane containing free NCO groups with an ether alkoxysilane of the general formula

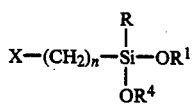

wherein
X is —SH, or —NHR$^2$,
R is —CH$_3$, —C$_2$H$_5$, or —OR$^1$,
R$^1$ is —(CH$_2$—CH$_2$—O)$_{\overline{m}}$R$^3$,
R$^2$ is H, —CH$_2$—CH$_2$—NH$_2$ or a C$_{1-10}$-aliphatic, C$_{3-10}$-cycloaliphatic or C$_{6-10}$ aromatic, hydrocarbon group of 1–10 carbon atoms,
R$^3$ is C$_{1-10}$-alkyl or hydrocarbon C$_{6-10}$-aryl,
R$^4$ is C$_{1-4}$-alkyl or one of the R$^1$ groups,
n is 1–6
m is 1–30.

2. A polymer of claim 1 wherein X is SH.
3. A polymer of claim 1 wherein X is NHR$^2$.
4. A polymer of claim 1 wherein
R is OR$^1$,
R$^2$ is H, —CH$_3$, or —C$_2$H$_5$,
R$^3$ is methyl, ethyl or phenyl,
R$^4$ is the same as R$^1$,
n is 2 or 3, and
m is 1–3.

5. A polymer of claim 1 wherein the ratio of alkoxysilane reactant to polyether urethane reactant is 1:2 to 1:1 in terms of the number of X and NCO groups.

6. A polymer of claim 1 whose molecular weight is about 1.000–35.000.

7. A polymer of claim 1 wherein the molecular weight of the polyether urethane reactant is about 2,000–25,000.

8. A polymer of claim 1 wherein the polyether urethane reactant is a reaction product of a polypropylene glycol of a molecular weight of about 500 to 6,000 and a hydrocarbon, aliphatic, cycloaliphatic, cycloaliphaticaliphatic or aromatic di- or polyisocyanate.

9. A polymer of claim 8 wherein the isocyanate is isophorone diisocyanate, tolylene diisocyanate, hexamethylene diisocyanate, trimethylhexamethylene diisocyanate or a prepolymer thereof.

10. A polymer of claim 1 which is chain extended by reactions with an at least di-functional amine, mercaptan or alcohol chain extender.

11. A polymer of claim 1 which is chain terminated by reaction with a monofunctional amine, mercaptan or alcohol chain terminator.

12. A polymer of claim 11 wherein the chain terminator is a monofunctional alcohol of 10–18 carbon atoms.

13. A polymer of claim 11 having an NCO content of essentially 0%.

14. A chain extended polymer of claim 10 having an NCO content of 0–0.7%.

15. In a composition comprising a crosslinkable polyurethane polymer and an additive adapted to the intended end-use of said composition, the improvement wherein the polyurethane polymer is one of claim 1.

16. A composition of claim 15 wherein the additive is an accelerator.

17. A composition of claim 15 which is stored in an essentially water free environment.

18. A composition of claim 15 wherein the additive is a compatible filler, pigment, colorant, plasticizer, thickener, antioxidant, adhesion promoter, thixotropic agent, solvent or extender.

19. A composition of claim 15 wherein at least one additive is adapted for use of the composition as an elastic coating agent, a sealing agent or an adhesive agent.

20. In a method of coating a surface with an elastic coating agent, sealing a surface with a sealing agent or adhering two surfaces with an adhesive agent, in each case comprising applying said agent to said surface and permitting said agent to cure, the improvement wherein said agent is a composition of claim 15.

21. A polymer of claim 1 wherein R is an —OR$^1$ group and R$^4$ is an R$^1$ group.

* * * * *